United States Patent [19]

Ames

[11] 3,925,201

[45] Dec. 9, 1975

[54] METHOD OF DEWATERING MATERIAL CONTAINING SOLID MATTER AND BOUND AND UNBOUND WATER

[75] Inventor: Robert K. Ames, Seattle, Wash.

[73] Assignee: Resources Conservation Co., Renton, Wash.

[22] Filed: Aug. 3, 1973

[21] Appl. No.: 385,489

[52] U.S. Cl. .................................. 210/22; 210/10
[51] Int. Cl. ............................................ B01d 11/02
[58] Field of Search ........ 23/312 A, 312 W; 210/10, 210/21, 22, 43, 56, 59, 71

[56] References Cited
UNITED STATES PATENTS

| | | | |
|---|---|---|---|
| 2,967,825 | 1/1961 | Baniel | 210/21 |
| 3,088,909 | 5/1963 | Davison et al. | 210/22 |
| 3,365,395 | 1/1968 | McDonald | 210/21 |

OTHER PUBLICATIONS

Zeitoun et al., "Solvent Extraction of Secondary Waste Water Effluents," WPCFJ, Apr. 1966, pp. 544–554.

Merck Index, 6th Edition, 1952, p. 972.

Primary Examiner—Charles N. Hart
Assistant Examiner—Peter A. Hruskoci
Attorney, Agent, or Firm—Bacon & Thomas

[57] ABSTRACT

A sludge, or other material containing solid matter and bound and unbound water, is dewatered by first pretreating the sludge with an alkaline composition, admixing the pretreated sludge with an amine having an inverse critical solution point with water, lowering the temperature of the resulting slurry below the inverse critical solution point, and separating the solid matter from the resulting single phase liquid. The single phase liquid is then heated to a temperature above the inverse critical solution point to form an amine phase and a water phase, after which the water phase is separated from the amine phase. The pretreatment of the sludge with the alkaline material substantially reduces the amount of residual amine carried over into the solid and water products. Effective alkaline materials include lithium, sodium, potassium and calcium hydroxides and the salts of relatively strong bases and weak acids, such as potassium phosphate.

10 Claims, 1 Drawing Figure

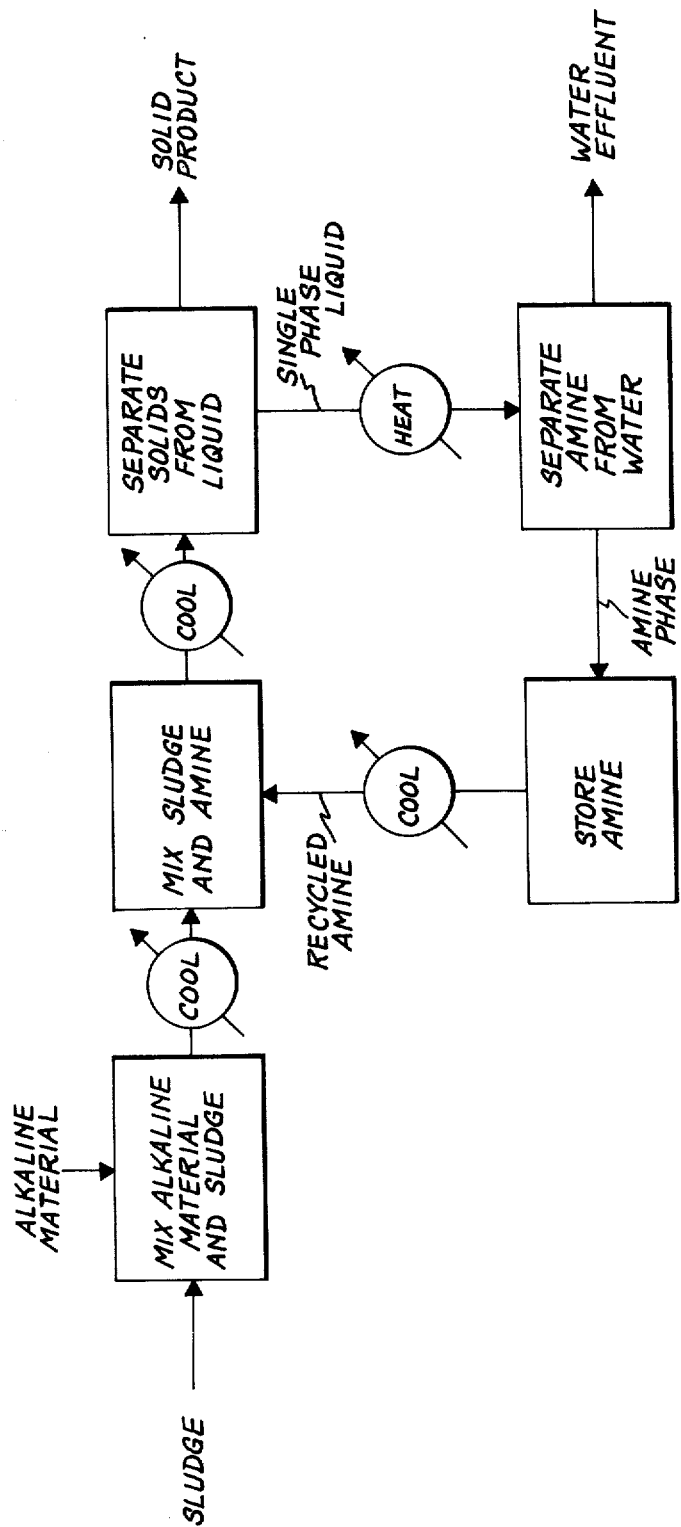

METHOD OF DEWATERING MATERIAL CONTAINING SOLID MATTER AND BOUND AND UNBOUND WATER

BACKGROUND OF THE INVENTION

This invention relates to an improved method for dewatering material containing solid matter and bound and unbound water by combining the material with a secondary or tertiary amine having an inverse critical solution point with water, lowering the temperature below the inverse critical solution temperature and separating the solid matter from the resulting single phase liquid. More particularly, the method relates to an improved process by which the residual amine in the solid matter and in the water effluent, separated from the amine after raising the temperature of the single phase liquid above the inverse critical solution temperature, can be substantially decreased.

The basic method for separating water from a material containing solid matter and bound and unbound water on which the present invention is based is described and claimed in a copending application, given Ser. No. 288,872, filed Sept. 13, 1972 now abandoned and refiled as Ser. No. 481,757 on June 21, 1974, assigned to the assignee hereof, and expressly incorporated herein by the reference. As disclosed in the aforementioned application, the material to be dewatered is mixed with an amine or mixture of amines, which exhibits an inverse critical solution point with water. The temperature of the resulting mixture is then lowered below the inverse critical solution temperature, below which temperature the amine and the water present in the solid material become miscible and form a single phase liquid. Other compositions which may be present in the original material and which are soluble in water or in the amine are also solubilized in the single phase liquid. The liquid and solid components of the mixture are then mechanically separated to yield a solid phase containing substantially all of the solid matter from the original material and a single phase liquid fraction comprising the amine and the water from the original material. The solid fraction is then processed further as desired.

The single phase liquid is then heated to a temperature above the critical solution temperature, thereby forming a two-phase liquid system comprising a water phase with a small amount of amine dissolved therein and an amine phase with a small amount of water dissolved therein. The water phase is then processed further as desired. The amine phase can be recycled, if desired, for admixture with additional solid matter containing unbound and bound water.

As defined in the aforementioned application and as used herein, the term sludge refers to an original starting material to be dewatered. A sludge contains solid matter in particulate or finely divided form in combination with water in either bound or unbound form. A typical sludge, such as sewage sludge, also contains materials other than particulate matter and water, for example, fats and oils. The term slurry is used herein to refer to the mixture of the starting material and the amine.

The term bound water as used herein is that water in solid matter which exerts a vapor pressure less than that of pure water at a given pressure and temperature. The water may become bound by retention in small capillaries in the solid matter, by solution in cell or fiber walls, by homogeneous solution throughout the solid, or by physical absorption on solid surfaces. The term bound water includes hydrated water, water of crystallization, and water which is bound by ionic bonds to solid matter. An example of the latter type of bound water is that which is bound to proteinaceous material by hydrogen bonds. In addition, bound water can include that water which is retained in a biocell mass, either on or inside the cell wall. The term unbound water as used herein is that water in excess of the equilibrium water content in the solid matter corresponding to saturation humidity. Water which is bound or unbound can be removed by the foregoing dewatering method.

In accord with the foregoing method the dewatering solvent, a secondary or tertiary amine as defined below, is one which exhibits an inverse critical solution point in a two-phase system with water. The most preferred amines are those which exhibit an inverse critical solution point at or near atmospheric pressure and prevailing ambient temperatures. Below the inverse critical solution point the water and the amine are completely miscible in all proportions. Above the inverse critical solution point the amine and water will separate into two distinct phases, one phase being primarily amine with a small amount of water in solution therewith and the other phase being primarily water with a small amount of amine dissolved therein.

As set forth in the aforementioned copending application and for purposes of the present invention, the preferred class of amines are those which comprise a member of or mixtures of members of the group having the formula

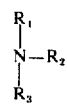

wherein $R_1$ can be hydrogen or alkyl, wherein $R_2$ and $R_3$ can be independently selected from alkyl radicals having from one to six carbon atoms or alkenyl radicals having from two to six carbon atoms, wherein the total number of carbon atoms in the amine molecule can be in the range of from three to seven inclusive, and wherein the amine exhibits an inverse critical solution temperature in a two-phase system with water. Triethylamine is the most preferred of the foregoing class of amines because of its cost and its lack of polar solvent attraction. Triethylamine exhibits an inverse critical solution point at a pressure of 760 millimeters of mercury and a temperature of approximately 18.7°C. (approximately 66°F. These data on the inverse critical solution point are approximations, relating the best available data at this time.

It is to be understood that the inverse critical solution temperature may be slightly affected by the presence of salts, compositions soluble in the amine of water, and insoluble particulate or solid matter. For any given liquid-solid system within the pervue of this invention, however, there is a predeterminable temperature below which the water and the amine will become completely miscible.

Although the foregoing prior art method can efficiently and effectively separate a substantial amount of water from sludges, it has been found that a residual amount of the amine carries over into the solid fraction separated from the slurry and also carries over into the water phase (or effluent) which is separated from the two-phase amine-water system.

Any significant amount of residual amine in the products are undesirable from a process control standpoint, from an economic standpoint, and from a waste disposal standpoint. The amount of amine present in the solid fraction separated from sewage sludge by the foregoing process is on the order of 2% by weight, representing a substantial loss of material which could otherwise be reused in the process. The residual amine in the water effluent is on the order of only 0.2% by weight. Although this amount is less than that which is left in the solid fraction, it is significant from two standpoints. First the weight percentage of water produced when dewatering sewage sludge is substantially greater than the weight fraction of solids, creating a greater actual loss of amine from the process. Moreover, from an ecological standpoint it is undesirable to discharge the water effluent containing even 0.2% by weight of an amine.

Accordingly, it is a broad object of the present invention to reduce the residual amine carried over into the solid fraction separated from the single phase liquid and to reduce the residual amine carried over into the water effluent which is separated from the amine phase.

SUMMARY OF THE INVENTION

The foregoing object and other objects, which will become apparent upon reading the following specification, are achieved by pretreating a sludge to be dewatered with an alkaline composition prior to admixing the sludge with amine. The alkaline composition comprises bases, such as lithium, potassium, sodium, and calcium hydroxides, and the salts of relatively strong bases and weak acids, such as the lithium, potassium, and sodium salts of weak acids. The pretreatment method of the present invention reduces the amount of residual amines in both the solid fraction and the water effluent to a level on the order of one-tenth of that occurring with no pretreatment.

BRIEF DESCRIPTION OF THE DRAWINGS

The accompanying drawing is a flow diagram representing the several process steps which are performed in accord with the present invention to dewater a sludge. The process is initiated by mixing sludge with an alkaline material. The process yields a dewatered solid product, a recyclable amine and a waste water effluent.

DESCRIPTION OF PREFERRED EMBODIMENT

In accord with the present invention a sludge to be dewatered is thoroughly admixed with an alkaline material prior to combination with an amine of the foregoing class. Mixing of the alkaline material with the sludge can be accomplished using conventional procedures and equipment. If the sludge has a high water content, conventional liquid mixing apparatus can be used. If the sludge has a low water content accompanied by a high viscosity, heavy duty mixing apparatus of conventional design may be required. The mixture of sludge and alkaline material is then combined with a secondary or tertiary amine and again thoroughly mixed utilizing conventional apparatus.

As described in a copending application filed concurrently herewith in the name of Hans H. Peters, Serial No. 385488, filed Aug. 3, 1973, best separation results will be obtained if the temperature of the amine and the sludge is not allowed to rise above the inverse critical solution temperature prior to separation. Preparatory to separation the slurry formed from admixture of the amine and the sludge is cooled to a temperature on the order of 25°F. below the inverse critical solution temperature. At this temperature the amine and water in the sludge will be completely miscible, forming a single phase liquid with the solid matter suspended therein. The solid matter is then separated from the liquid by conventional solid-liquid separation techniques such as centrifugation or filtration. The solid matter derived from the separation step can then be further processed. For example, it can be forwarded to a heating zone where any residual water can be driven off preparatory to disposal. Thereinafter the single phase liquid derived from the liquid-solid separation step is heated to a temperature above the inverse critical solution temperature, causing separation of the single phase liquid into an amine phase and a water phase. The two liquid phases are then separated by conventional methods such as decantation. The water effluent is then discarded. The amine phase can be recycled to a storage zone and after cooling can be recycled for admixture with additional pre-treated sludge.

The alkaline materials which are efficacious in reducing the amine content in the separated solids and in the water effluent are of two classes. The first class includes certain bases including lithium hydroxide, potassium hydroxide, sodium hydroxide, and calcium hydroxide. The second class comprises the salts of weak acids and relatively strong bases. These salts include the lithium, potassium and sodium salts of weak acids such as lithium phosphate, potassium phosphate and sodium carbonate. In the latter class it is important that the anion of the salt be relatively active as compared to the cation. Thus, the salts of weak acids and weak bases and the salts of weak bases and strong acids do not provide good results. It is to be understood that other materials equivalent to those specifically set forth above will be useful in accord with the present invention.

The exact mechanism by which the alkaline material when pre-mixed with a sludge reduces the amine residue in the solid fraction is not known. However, it is believed that the anions from the bases and salts enumerated above are attracted to certain chemically and physically active sites in the solid matter and become attached thereto. In this matter it is believed that the anions reduce the number of sites in the solid matter to which the amines would otherwise become attracted. Thus the amine will remain in the single phase liquid rather than being carried over into the solid product. Likewise it is believed that very small amounts of colloidal solid matter and soluble solid matter are present in the water effluent. The anions of the alkaline material use up the sites on the solid matter in the effluent and, therefore, displace any amine which might otherwise be attracted to the sites.

Only a small amount of alkaline material need be added to the sludge. The amount added need only be sufficiently effective to reduce the residual amine in the solid fraction and water effluent. If too large a quantity of alkaline material is added, for some sludges over about 2% by weight, the solid matter in the sludge will begin to flocculate but will not precipitate. This flocculation will reduce the efficiency of the process by increasing the time required for separating the solid fraction from the single phase liquid. It has been found, however, that even very small amounts of alkaline material will reduce the residual amine in both the solid fraction and in the water effluent. As set forth below, it has been found that certain alkaline materials will provide better results with a given sludge than will other alkaline materials.

The pretreatment step of the present invention will reduce the residual amine in the solid fraction and water effluent produced from both organic and inorganic sludges. Examples of organic sludges are aerobic and anaerobic sewage sludges obtained from sewage treatment processes. An example of an inorganic sludge on which the process of the present invention is particularly efficacious is a hydrated alum sludge which is produced as a waste product from potable water treatment processes.

An aerobic (or activated) sewage sludge as used herein is the settled product taken from an aerated settling basin in a sewage treatment facility. This aerobic sludge contains a variety of organic and inorganic materials in solution with and suspension in water. Normally, the solids content of an activated sludge is on the order of 0.7% by weight to 1.5% by weight. Calcium hydroxide is a particularly effective alkaline material for pretreatment of an activated sludge by the process of the present invention. It is preferred that calcium hydroxide be admixed with an activated sludge in amounts ranging up to about 2% by weight based on the sludge.

An anaerobic sewage sludge is one which is taken from an anaerobic digester in a sewage treatment plant. Frequently, an activated sludge and primary settled solids from raw sewage are placed in an anaerobic digester to break down the sludge into a relatively innocuous mass. The anaerobic sludge derived from the digester normally contains on the order of 2% to 7% by weight solids based on the sludge. Sodium hydroxide is a particularly effective alkaline material for use in pretreatment of anaerobic sewage sludge. It is preferred that sodium hydroxide be added to anaerobic sludge in amounts up to about 1.2% by weight based on the sludge.

Other sludges, including the alum sludge mentioned above, fish water, green plant waste and many other materials containing bound and unbound water can be dewatered by the foregoing process. With each of these sludges a significant amount of amine is carried over into the solid fraction and the water effluent. This residual amine can be significantly reduced by pretreatment with one or more of the alkaline materials mentioned above.

The following examples are set forth to better enable one of ordinary skill in the art to reproduce the invention as described above. These examples are intended to be illustrative and are not intended in any manner to limit the invention described and claimed herein.

EXAMPLE I

A first control separation is conducted by placing 100 ml. (approximately 100 gr.) of a sludge from an anaerobic digester in a 500 ml. beaker. The temperature of the sludge is reduced to 9°C. 400 ml. of triethylamine at a temperature of −1° C. is added to the beaker to form a slurry. The dissolution reaction is exothermic causing the temperature of the slurry to rise to about 15° C. Care must be taken to maintain the temperature of the slurry below about 18.7° C. (about 65.6° F.), the inverse critical solution temperature of triethylamine. The beaker and its contents are then placed in a chiller and cooled to a temperature of about 2° C., while stirring periodically. A 4 inch Buchner funnel having a modacrylic filter cloth positioned in the bottom thereof is placed in a one liter vacuum flask. The filter cloth is a number OPN-E603-AJ8, available from Ametek, Manhattan Beach, Calif. The contents of the beaker are poured into the Buchner funnel. A vacuum measuring between about 6 psi and 10 psi absolute is drawn on the flask. The filtration time is about 80 seconds. The end of the filtration time period occurs when the liquid disappears from the top of the filter cake. The filter cake (dewatered solids) is removed from the filter and placed on a drying dish. The dish and contents are placed in an oven at 220° F. and dried for 24 hours. The dried solids weigh 1.72 gr. The amount of dry solids in the original sludge is found to be about 1.72° by weight.

One gram of the dried cake is then ground with a motar and pestle and combined with 10 ml. of 0.2N NaOH in a test tube. The contents of the test tube are mixed vigorously for two hours, after which the test tube is turned upright to allow the solids to settle. After settling the liquid is decanted from the solids. A 0.4 microliter sample of the solids is then injected into a Beckman model GC-4 gas chromatograph using a dual-flame ionization detector. (This chromatograph is available from Beckman Instruments of Palo Alto, California.) The chromatograph has a 6 foot by ⅛ inch diameter packed column. Helium is used as the carrier gas and flows through the column at a rate of 33 cc./min. The column is packed with "Chromosorb 103" polymer supports available from Johns-Mannville Corporation, New York, N.Y. The column temperature is 220° C. The detector temperature is 290° C. After the sample is run through the column, a reading is taken. The percent of triethylamine is calculated by comparison against a standard calibration curve generated from a series of calibration runs using water-triethylamine samples of known composition. The filter cake contains about 1.90% triethylamine by weight.

The liquid from the vacuum flask (a solution comprising water and triethylamine) is then heated to a temperature of about 68° F and maintained at or above that temperature for about one hour. At this temperature separation of the liquid into two distinct phases occurs. The triethylamine is decanted from the water phase. The water phase is then boiled until the volumn is reduced by about 15% to simulate a distillation step. (Triethylamine has a boiling point of about 89° C.) An amount of distilled water sufficient to bring the water phase back to its original volumn is then added. A 0.4 ml. aliquot of the reconstituted water phase is then analyzed with a Beckman GC-4 chromatograph following the procedure outlined above. The water phase (or effluent) contains about 0.17% by weight of triethylamine.

EXAMPLE II

The procedure of EXAMPLE I is repeated. However, prior to mixing the sludge with triethylamine, the sludge is combined with 0.5 ml. of 0.2N NaOH solution and thoroughly mixed. Thereafter the procedure of EXAMPLE I is followed. The results are tabulated in Table I appearing below.

EXAMPLE III-V

The procedure of EXAMPLE II is repeated, mixing increasing amounts of sodium hydroxide with the sludge prior to combining it with triethylamine. The results are tabulated in Table I.

EXAMPLE VI

The procedure of EXAMPLE I is repeated using an anaerobic sewage sludge taken from the same anaerobic digester, but at a different time. the results are tabulated in Table I.

EXAMPLE VII

The procedure of EXAMPLE VI is repeated, first pretreating the sludge by thoroughly mixing 0.25 gm. of calcium hydroxide with the sludge prior to combining it with triethylamine. The results are tabulated in Table I.

EXAMPLES VIII-XI

The procedure of EXAMPLE VII is repeated, first pretreating the sludge with increasing amounts of calcium hydroxide. The results are tabulated in Table I.

EXAMPLE XII

The procedure of EXAMPLE VI is repeated, first pretreating the sludge with 0.25 grams of potassium phosphate ($K_3PO_4$) in place of calcium hydroxide. The results are tabulated in Table I.

effluent and the solids product is quite high. When the sludge is pretreated with an alkaline material, the amount of amine residue in the water effluent and in the solids product is significantly reduced. By increasing the amount of alkaline material with which the sludge is pretreated, the amount of residual amine is further reduced. As cautioned above, however, the addition of large quantities of alkaline material will cause flocculation of the solids in the sludge which in turn will tend to reduce the quality of solid-liquid separation and to increase the time required for separation.

The present invention has been described in relation to a preferred embodiment in which triethylamine is employed as the dewatering solvent. All of the secondary and tertiary amines of the class described above can be used with the improved process disclosed herein. Specific examples of the types of alkaline material which will effect a reduction in the residual amine in the separation products have been given. These alkaline materials, as well as those described above as part of the general class of alkaline materials and their equivalents can be employed with good results. It is to be understood that the one of ordinary skill in the art, once understanding the invention, will be able to make various changes in the process steps and will be able to substitute equivalent materials without departing from the overall concept disclosed herein. It is therefore intended that the present invention be limited only by the definition contained in the appended claims and the

TABLE I

| Example No. | I | II | III | IV | V | VI |
|---|---|---|---|---|---|---|
| Alkaline material, identification | No Pretreat | 0.2N NaOH | 0.2N NaOH | 0.2N NaOH | 0.2N NaOH | No Pretreat |
| Alkaline material, amount added | | 0.5 ml. | 1 ml. | 2 ml. | 3 ml. | |
| Temperatures | | | | | | |
| sludge | 9°C. | 10°C. | 10°C. | 11.5°C. | 12°C. | 44°F. |
| TEA | −1°C. | −2°C. | −1°C. | −1°C. | −1°C. | 28°F. |
| mixture | 15°C. | 14°C. | 14.5°C. | 14.5°C. | 14°C. | 58°F. |
| filtration | 2°C. | 2°C. | 3.5°C. | 3°C. | 3.5°C. | 34°F. |
| Filtration time (sec.) | 80 | 150 | 65 | 48 | 60 | 15 |
| Dry weight of solids (gm.) | 1.72 | 1.74 | 2.13 | 2.45 | 2.29 | 2.70 |
| Weight percent of solids (based on original sludge) | 1.72 | 1.72 | 1.73 | 1.65 | 1.00 | 2.70 |
| TEA in effluent (% by weight) | 0.17 | 0.076 | 0.023 | 0.010 | 0.0062 | 0.16 |
| TEA in solid fraction (% by weight) | 1.90 | 0.66 | 0.12 | 0.11 | 0.17 | 2.04 |
| Example No. | VII | VIII | IX | X | XI | XII |
| Alkaline material, identification | CaOH | CaOH | CaOH | CaOH | CaOH | $K_3PO_4$ |
| Alkaline material, amount added | 0.25 gm. | 0.5 gm. | 0.75 gm. | 1.0 gm. | 2.0 gm. | 0.25 gm. |
| Temperatures | | | | | | |
| sludge | 57°F. | 60°F. | 63°F. | 62°F. | 62°F. | 68°F. |
| TEA | 30°F. | 28°F. | 29°F. | 29°F. | 28°F. | 26°F. |
| mixture | 60°F. | 58°F. | 60°F. | 59°F. | 62°F. | 59°F. |
| filtration | 35°F. | 34°F. | 34°F. | 32°F. | 34°F. | 34°F. |
| Filtration time (sec.) | 30 | 45 | 55 | 110 | 210 | 35 |
| Dry weight of solids (gm.) | 2.93 | 3.16 | 3.52 | 3.77 | 5.19 | 2.96 |
| Weight percent of solids (based on original sludge) | 2.68 | 2.66 | 2.76 | 2.77 | 3.19 | 2.71 |
| TEA in effluent (% by weight) | 0.13 | 0.10 | 0.09 | 0.34 | 0.19 | 0.07 |
| TEA in solid fraction (% by weight) | 1.82 | 1.31 | 0.90 | 0.47 | 0.55 | 0.88 |

As can be seen by a review of the data in Table I, with no pretreatment the amine residue in both the water equivalents thereof.

What is claimed is:

1. In the process for dewatering a sludge containing solid matter and water including the steps of:
   admixing said sludge with a secondary or tertiary amine to form a mixture, said amine having the formula

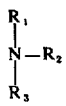

wherein:
   $R_1$ is hydrogen or alkyl,
   $R_2$ and $R_3$ are alkyl radicals having from one to six carbon atoms or alkenyl radicals having from two to six carbon atoms, and
   the total number of carbon atoms in the molecule being in the range of from three to seven, inclusive, said amine having an inverse critical solution temperature in a two phase system with water, and
   maintaining the temperature of said mixture below the inverse critical solution temperature of said amine to yield a single phase liquid containing said amine and water and a solid phase containing at least a portion of said solid matter which is insoluble in said single phase liquid and separating said solid phase from said single phase liquid, the separated solid phase containing residual amine, the improvement comprising:
   prior to admixing said sludge and said amine, admixing with said sludge an alkaline composition selected from lithium hydroxide, sodium hydroxide, potassium hydroxide, calcium hydroxide, and a lithium, sodium or potassium salt of a weak acid in an amount effective to reduce the residual amine in said solid phase after separation from said single phase liquid.

2. The process of claim 1 further including the steps of:
   increasing the temperature of said single phase liquid above the inverse critical solution temperature to form an amine phase and a water phase, and
   thereafter separating said water phase from said amine phase, the improvement further comprising:
   admixing with said material an amount of said alkaline composition effective to reduce the residual amine in said water phase after separation from said amine phase.

3. The process of claim 2 wherein said sludge comprises sewage sludge.

4. The process of claim 3 wherein said sewage sludge comprises an anaerobic sewage sludge and wherein said alkaline compositon comprises sodium hydroxide.

5. The process of claim 4 wherein said amine comprises triethylamine.

6. The process of claim 3 wherein said sewage sludge comprises aerated sewage sludge and wherein said alkaline composition comprises calcium hydroxide.

7. The process of claim 6 wherein said amine comprises triethylamine.

8. The process of claim 1 wherein said sludge comprises hydrated alum sludge.

9. In the process for dewatering a sludge containing solid matter and water including the steps of:
   admixing said sludge with a secondary or tertiary amine to form a mixture, said amine having the formula

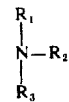

wherein:
   $R_1$ is hydrogen or alkyl,
   $R_2$ and $R_3$ are alkyl radicals having from one to six carbon atoms or alkenyl radicals having from two to six carbon atoms, and
   the total number of carbon atoms in the molecule being in the range of from three to seven, inclusive, said amine having an inverse critical solution temperature in a two phase system with water,
   maintaining the temperature of said mixture below the inverse critical solution temperature of said amine to yield a single phase liquid containing said amine and water and a solid phase containing at least a portion of said solid matter which is insoluble in said single phase liquid and separating said solid phase from said single phase liquid, the separated solid phase containing residual amine
   increasing the temperature of said single phase liquid above the inverse critical solution temperature to form an amine phase and a water phase containing residual amine, and
   thereafter separating said water phase from said amine phase, the improvement comprising:
   prior to admixing said sludge and said amine, admixing sodium hydroxide with said sludge in an amount up to about 1.2% by weight based on said sludge effective to reduce the residual amine in said solid phase after separation from said single phase liquid and to reduce the residual amine in said water phase.

10. In the process for dewatering a sludge containing solid matter and water including the steps of:
    admixing said sludge with a secondary or tertiary amine to form a mixture, said amine having the formula

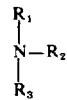

wherein:
    $R_1$ is hydrogen or alkyl,
    $R_2$ and $R_3$ are alkyl radicals having from one to six carbon atoms or alkenyl radicals having from two to six carbon atoms, and
    the total number of carbon atoms in the molecule being in the range of from three to seven, inclusive, said amine having an inverse critical solution temperature in a two phase system with water,
    maintaining the temperature of said mixture below the inverse critical solution temperature of said amine to yield a single phase liquid containing said amine and water and a solid phase containing at least a portion of said solid matter which is insoluble in said single phase liquid and separating said solid phase from said single phase liquid, the separated solid phase containing residual amine
    increasing the temperature of said single phase liquid above the inverse critical solution temperature to form an amine phase and a water phase containing residual amine, and thereafter separating said water phase from said amine phase, the improvement comprising:

prior to admixing said sludge and said amine, admixing calcium hydroxide with said sludge in an amount up to about 2.0% by weight based on said sludge effective to reduce the residual amine in said solid phase after separation from said single phase liquid and to reduce the residual amine in said water phase.

* * * * *